United States Patent [19]

Vassalotti

[11] Patent Number: 4,664,586
[45] Date of Patent: May 12, 1987

[54] CLOSURE MEMBER HANDLING SYSTEM

[75] Inventor: Michele Vassalotti, Warwick, R.I.

[73] Assignee: EG&G Sealol, Inc., Warwick, R.I.

[21] Appl. No.: 673,813

[22] Filed: Nov. 21, 1984

[51] Int. Cl.$^4$ .............................................. B66F 5/04
[52] U.S. Cl. .................................. 414/590; 414/642;
414/684.3; 414/783; 414/609; 414/631;
414/719; 414/673; 212/166; 254/3 R; 254/93 R
[58] Field of Search ..................... 414/783, 684.3, 164,
414/446, 450, 451, 426, 427, 429, 754, 639, 609,
620, 621, 630, 631, 719, 640, 641, 642, 673, 662,
663, 728, 742, 908, 910, 911; 202/242; 212/166;
254/17, 3 R, 3 B, 3 C, 93 R

[56] References Cited
U.S. PATENT DOCUMENTS

| | | | |
|---|---|---|---|
| 1,135,983 | 4/1915 | Bartlett | 269/51 X |
| 1,190,036 | 7/1916 | Stauft | 212/166 |
| 2,879,059 | 3/1959 | Sandefur | 269/17 |
| 2,931,519 | 4/1960 | Beach | 414/589 |
| 3,067,884 | 12/1962 | Williams | 414/589 X |
| 3,915,311 | 10/1975 | Ball et al. | 414/766 |
| 4,010,942 | 3/1977 | Ward | 269/17 X |
| 4,049,131 | 9/1977 | Schrader et al. | 414/339 X |
| 4,148,401 | 4/1979 | Kautetzky | 414/590 |
| 4,238,169 | 12/1980 | De Priester et al. | 414/763 |
| 4,360,310 | 11/1982 | Kost | 414/684.3 |
| 4,440,265 | 4/1984 | Spagnoli | 414/589 X |

FOREIGN PATENT DOCUMENTS 3043145 7/1982 Fed. Rep. of Germany ...... 414/917
1500632 2/1978 United Kingdom ................ 212/166

OTHER PUBLICATIONS

J. H. Bickford, "The Initial Preload—What Happens to It?", in Mechanical Engineering—Oct. 1983.

Primary Examiner—Frank E. Werner
Attorney, Agent, or Firm—Robert P. Cogan

[57] ABSTRACT

A handling system supports a closure member, e.g. a manway cover or tensioner ring, for maintaining it in position when opening or closing operations are performed thereon and for moving it conveniently into or out of engagement with a mating member without damage to supporting studs. Gimbaling means include first and second attachable connections each vertically supported to a pneumatic cylinder assembly whose internal pressure is set to generate an upward force equal to the weight supported. An operator may provide a force to overcome damping forces at each support point to move the closure member in all degrees of freedom, and the member appears essentially weightless to the operator. The vertically movable connections are supported for translational movement on a cart which is also movable. Reliable movement of a closure member with respect to a pressure vessel is provided without the need for alignment or calibration of a path defined by the closure member support means.

24 Claims, 18 Drawing Figures

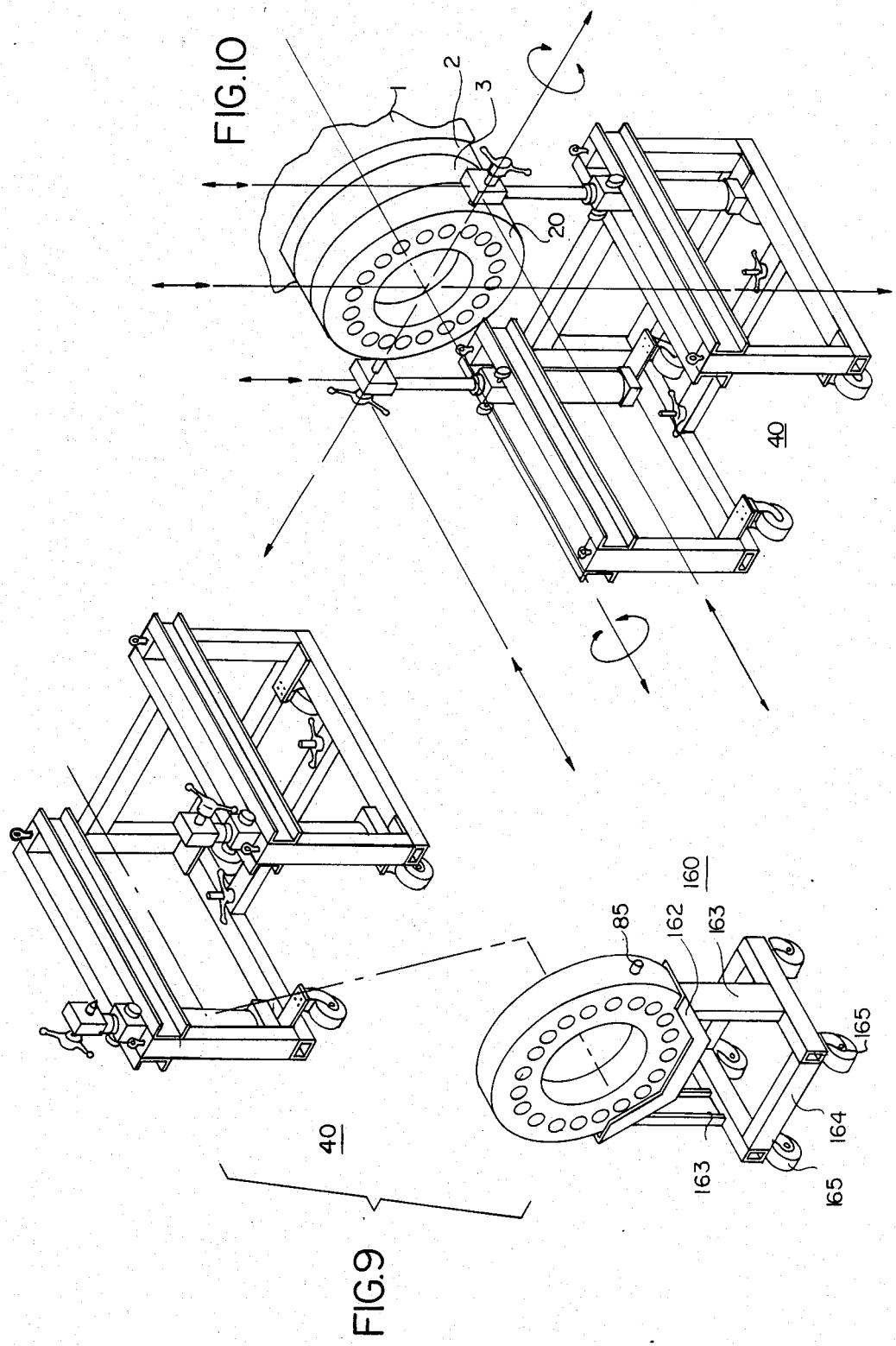

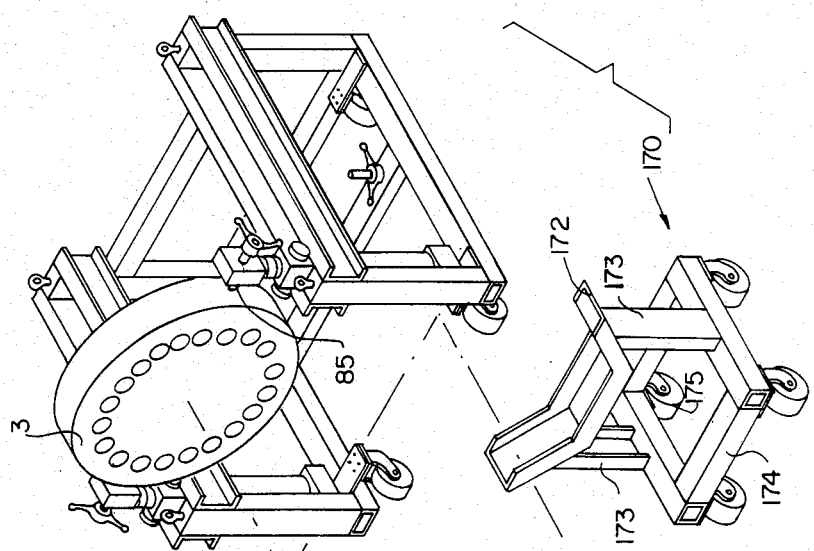
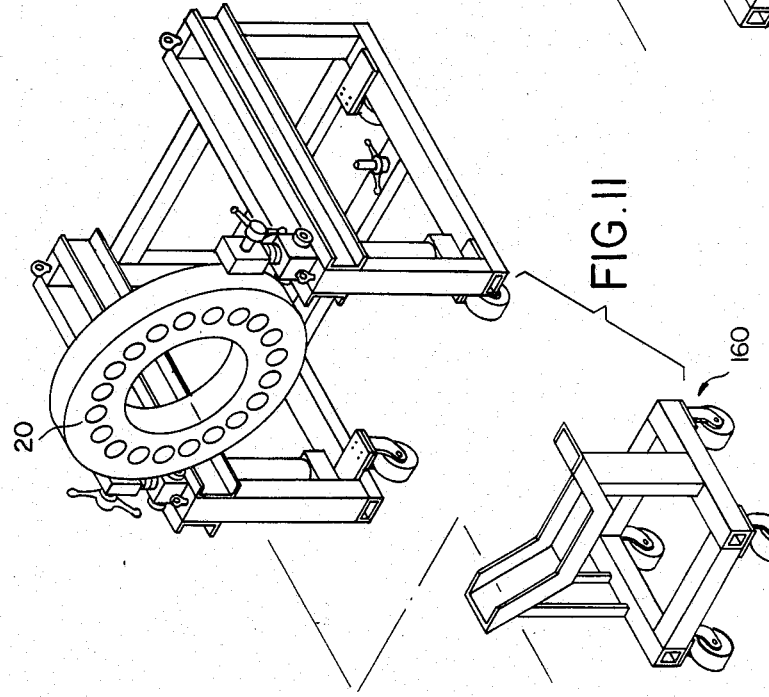

CLOSURE MEMBER HANDLING SYSTEM

BACKGROUND OF THE INVENTION

The present invention relates to manway cover tensioning systems and in particular to a means for handling closure members.

Manway covers as referred to are used to close access apertures in pressure vessels such as steam power generators in nuclear power plants. Very high compressive forces are needed to seal such openings. Hundreds of thousands of pounds of compressive force may be applied. A plurality of tensioning studs may each be tensioned to 50,000 to 100,000 pounds. Tensioning studs for large diameter closures has always been a problem. In the past, torque wrenches and bars have been employed to turn nuts with the intent of applying desired axial load on the studs. However, the axial force which is applied is a function of many factors in addition to the tangential force to be supplied by a wrench. They include coefficient of friction of the surface against which a nut is bearing. Another is friction between a thread and a stud itself. According to John H. Bickford in "The Initial Preload-What happened To It?", *Mechanical Engineering,* October 1983, there are some 76 variables that affect the relationship between the torque applied to a nut on a tensioning stud and the actual compressive force applied thereby due to the tension in which the stud has been placed. Further, in addition to being unreliable in the terms of precisely applying tensile force to a stud, torqueing can cause uneven stud tensioning, flange distortion, leakage, stud damage and injury to workers.

Therefore, systems have been developed in which studs which will hold a manway cover are stretched, such as hydraulically, to a desired tensile stress. Closure nuts are threaded to retain the manway cover. The force stretching the studs is then removed, and the studs are tensioned to compress the nuts against the manway cover. The closure member handling system must handle both a manway cover and tensioner ring in cooperation with each other.

Tensioner rings can be heavy and weigh on the order of hundreds of pounds. They are difficult to maneuver and must be held in place while the bolting process is performed. Prior art systems for handling tensioning rings include floor track-mounted systems in which a tensioning ring is supported to a support means slidable in a track to bring the tensioning ring into or out of engagement with the manway. Such systems require time-consuming realignments at each use due to thermal expansion due to the high temperature environment in which they commonly operate. Difficulties in use can also result in errors in alignment. Systems are generally limited in the degree of freedom of movement afforded in a tensioning ring as well.

In a floor-mounted track type system a closure member must be supported in a cantilevered manner, thus maximizing the stress applied to support components. In the case of nuclear power plants, the new installation of dedicated, installed floor systems provides a further problem of a structural modification. Structural changes require seismic requalification of the stucture.

SUMMARY OF THE INVENTION

It is therefore an object of the present invention to provide a closure member handling system for cooperation with a means to be closed which system is conveniently operable within spatial constraints such as those provided in the environment of pressure vessels and is conveniently operable and need not be permanently installed.

It is a more particular object of the present invention to provide a closure member handling system in which a closure member such as a manway cover or tensioner ring is gimbaled and supported by pneumatic means rendering the closure member effectively weightless so that an operator may apply manual force sufficient to overcome system damping.

It is also an object of the present invention to provide a system of the type described to provide a closure member handling system conveniently operable by an operator with minimum likelihood of damage to support studs.

Briefly stated, in accordance with the present invention, there is provided a closure member handling system including means for gimbaling a closure member at support points and supporting the closure member with detachably connectable support means providing for motion in translational and rotational degrees of freedom which support means are further movable. An operator can apply force at either or both of the releasably engaging connecting means. The system further includes releasable engaging connecting means for connection to and cooperation with manway covers and tensioner rings. The system may further include support and portability means for manway covers and tensioner rings, or more particularly storage carts which bring a manway cover or tensioner ring selectively into or out of registration such that the releasable attachment means may be engaged or disengaged. A fully contained closure member handling system may be provided in which closure members may be conveniently brought into the positioning systems or safely removed for storage.

BRIEF DESCRIPTION OF THE DRAWINGS

The means by which the foregoing objects and features of invention are achieved are pointed out with particularity in the claims forming the concluding portion of the specification. The invention, both as to its organization and manner of operation may be further understood by reference to the following drawings taken in connection with the following description.

Of the drawings:

FIGS. 9, 10, 11 and 12 are illustrations in axonometric form and simplified in detail illustrating the manner in which the present invention is employed and further illustrating components of systems in accordance with the present invention;

DESCRIPTION OF THE PREFERRED EMBODIMENTS

Figure 2:
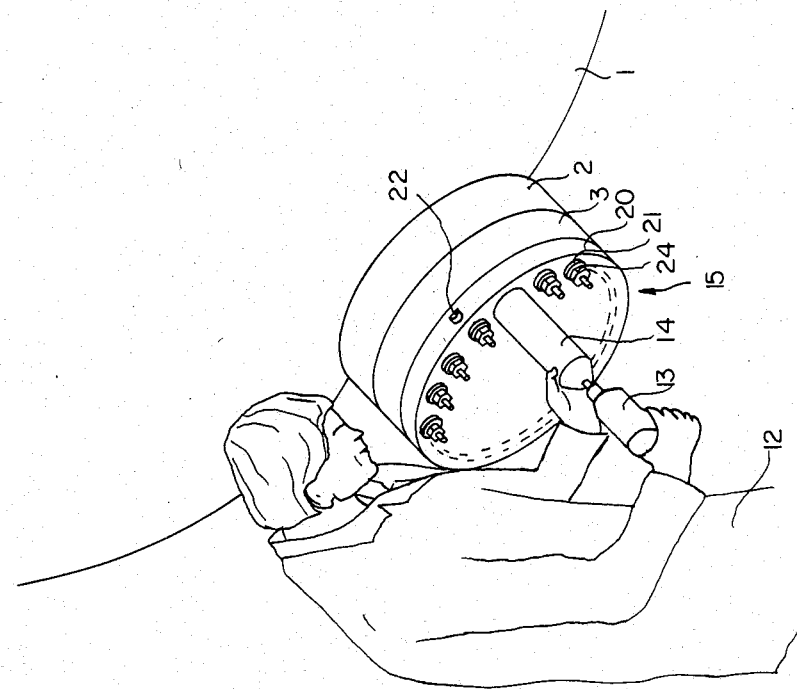
FIG. 2 is an illustration of an operator performing elements of the detensioning operation and further illustrating a tensioner ring in place of a manway cover.
Figure 1:
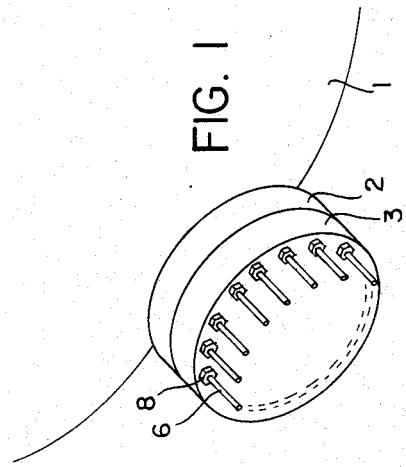
FIG. 1 is an axonometric illustration of a manway cover on a manway of a pressure vessel.

Referring now to FIG. 1, there is illustrated in axonometric form a pressure vessel 1 having a manway 2 closed by a mayway cover 3. In most power plant operations, the manway 2 is formed through a curved portion of the pressure vessel 1 so that ingress is substantially upwardly at 45° to the horizontal. Normally curvature of the pressure vessel one is such that the manway 2 is within the vertical projection of the pressure vessel 1. In other words, an operator working in the vicinity of the manway 2 is obstructed above the manway 2 by the pressure vessel 1. A plurality of studs 6 project through corresponding apertures 7 (FIG. 3) and each receives a closure nut 8. In FIGS. 1 and 2, for simplicity in the drawing, dotted lines represent components identical to those illustrated. The closure nuts 8 retain the manway cover 3 to the manway 2. In one common, nominal application, the manway cover 3 may weight 650 pounds. As described above, it can neither be easily handled nor accurately tensioned through the use of a torque wrench. The closure nuts 8 are preferably well-known "gear nuts". More specifically, in displaced axial section, they include respectively the well-known hexagonal head and gear teeth for rotation by a suitable tool (FIG. 3).

FIG. 2 is an axonometric illustration of an operator 12 utilizing a pneumatic wrench 13 and socket 14 on tensioner apparatus 15 which has been affixed to the manway cover 3 and which may be removed therefrom by operations described with respect to FIGS. 9 through 12 below. This Figure is provided to illustrate the prior art interaction between a tensioner ring and a manway cover, and the mayway cover and tensioner ring handling means are not shown in the present illustration. Tensioner apparatus 15 includes a tensioner ring 20 including piston units 21, each connected to be pressurized and extended when hydraulic pressure is supplied by pressure means (not shown) to a hydraulic inlet 22. In the present illustration, the operator utilizing the pneumatic wrench 13 with socket 14 on one of the reaction nuts 24, each of which extends through an annular piston 21 to engage an end of a stud 6.

Figure 3:
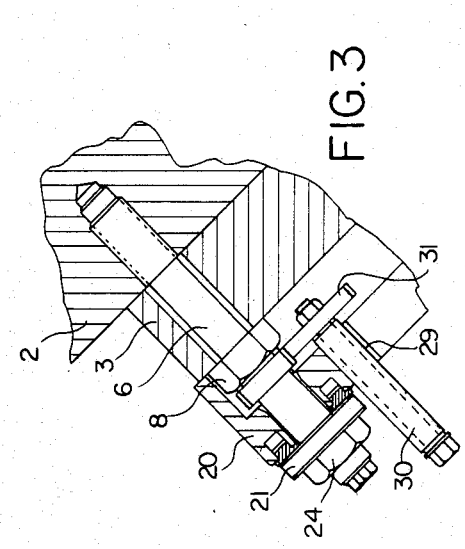
FIG. 3 is a partial, cross-sectional view of FIG. 2 illustrating the manway cover, tensioning components and tools.

This interaction is more clearly illustrated in FIG. 3, which is a partial cross-sectional view in which the same reference numerals denote corresponding components. FIG. 3 illustrates the state in which the studs 6 are fully tensioned, the closure nuts 8 are fully engaged with the manway covers 2 and the pistons 21 are being operated to stretch the studs 6. When the hydraulic input pressure is applied to the port 22, the pistons 21 are displaced axially, to the lower left as seen in FIG. 3, and the reaction nuts 24 by virtue of their being fully threaded onto the studs 6 each stretch a stud 6. The closure nut 8 may be then loosened. For this purpose, a slot 29 extending axially through the tensioning ring 20 in registration with each piston 21 may be provided for receiving a closure nut driving tool 30 having a gear 31 at an end thereof for rotating the closure nut 8. The operator 12 may use another impact wrench extension 13 to rotate the tool 30. Once this is done, pressure on the cylinders 21 is relieved, and the studs 6 are detensioned. The closure nuts 8 still retain the manway cover 2 to the pressure vessel 1 but are only "hand tight". The operator 12 may perform the operation illustrated in FIG. 2 to remove all the reaction nuts 24, remove the tensioner ring 20 by prior art means or in accordance with the present invention. Once the reaction nuts 24 are removed, the tensioner ring 20 will move over the studs 6 and out of engagement with the manway cover 3. The manway cover 3 may then be supported by prior art means or in accordance with the present invention and the closure nuts 8 removed.

Figure 4:
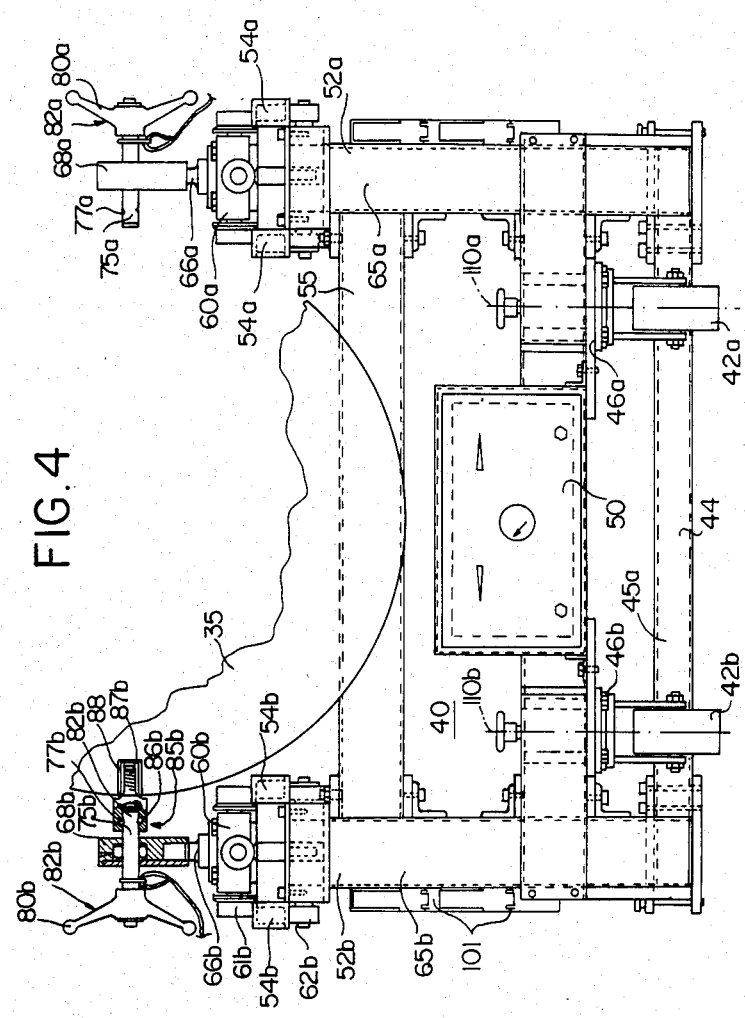
FIG. 4 is a front elevation of manway cover and tensioning ring handling apparatus included in the system of the present invention, also illustrating modification of a manway or tensioning ring in accordance with the present invention and additionally illustrating a tool for facilitating cooperation of the manway cover and tensioning ring with the system of the present invention.
Figure 6:
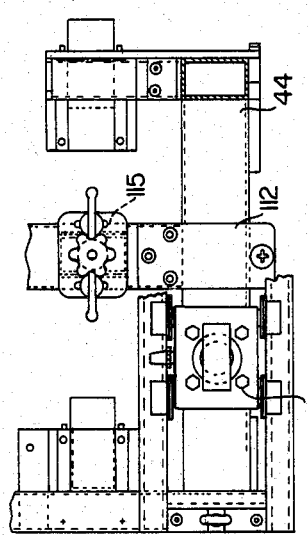
FIG. 6 is a partial plan view of FIG. 5.
Figure 5:
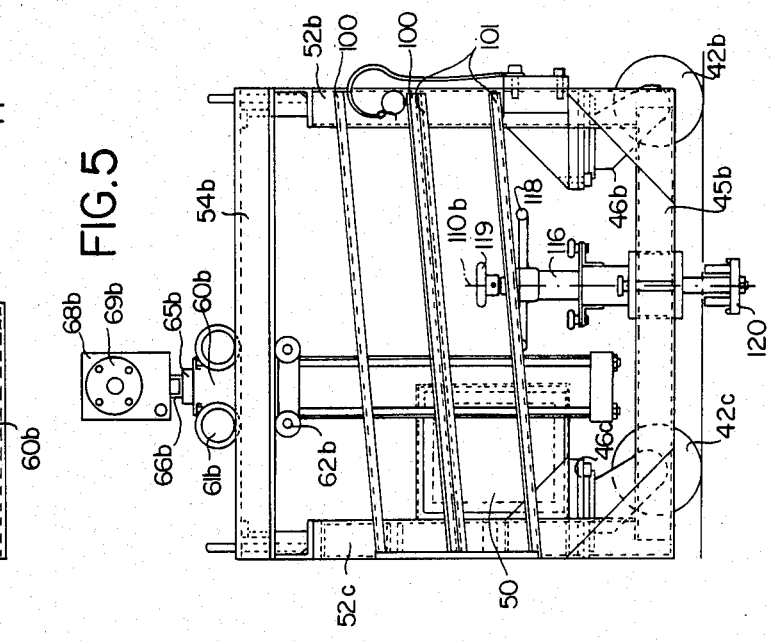
FIG. 5 is a side view of FIG. 4 further illustrating means for retaining the handling system of the present invention in place over a grating.

The handling system of the present invention incorporates the means illustrated in FIGS. 4 and 5 which are front and side elevations respectively and FIG. 6 which is a partial plan view of FIG. 5. FIG. 4 also illustrates a closure member 35, i.e. either a manway cover 3 or a tensioner ring 20 partially broken away and further illustrates means for modification of a cover and tensioner ring for cooperation with the system of the present invention. The apparatus in FIG. 4 comprises a cart 40 providing for support of a closure member 35 and for motion in several directions and degrees of freedom. In the present description, directions such as "transverse" are arbitrary and are simply used to define relationships. Where a plurality of similar components form a recited element denoted by a numeral in the specification, these components may be denoted by that numeral with differing lower case letter suffixes.

The cart 40 is mounted on means for providing translational and rotation motion, namely wheels 42 mounted to horizontal platform means 44. The horizontal platform means 44 may include three orthogonal beams 45 formed to define a square with an open end and supported to bracket means 46 to which the wheels 42 are mounted. The bracket means 46 support a hydraulic circuit 50 described in greater detail with respect to FIGS. 7 and 8. The platform means 44 supports four vertical support arms 52. The support arms 52 support first and second longitudinal rail means 54 each preferably comprising a pair of parallel rails. Further horizontal pieces 55 operate with the vertical support means 52 to provide further support.

Each longitudinal rail means 54 supports between the parallel portions thereof a cylinder carriage 60 having upper wheels 61 and lower wheels 62 for supporting a pneumatic cylinder 65 for providing for vertical displacement. Each cylinder carriage 60 includes a bearing support portion 66 mounted to the pneumatic cylinder 65 (FIGS. 5 and 6) for supporting a spherical-linear bearing housing 68 including a spherical-linear bearing 69. As best seen in FIG. 4, the linear bearing includes a truncated spherical bearing having a shaft 75 with detent means 77 at an end thereof journaled therein having a handle 80 affixed to an outer end thereof to form a T-pin assembly 82, or T-pin 82. The shaft 75 is movable in a bearing 69 and the spherical portion of the bearing provides rotational degrees of freedom as well. A remote end 82 of the shaft 75 from the handle 80 is received in a bushing assembly 85 having a bore and detent retaining means 86 at one end and a threaded portion 87 for receipt in an aperture 88 to be formed in both manway rings 3 and tensioners 20. By use of the bushing assembly 85, a manway cover and a tensioner ring may each be made an integral part of the present system. The bushing assembly 85 and T-pin 82 comprise means for releasably engaging closure members 35. As will be seen with respect to the embodiment of FIGS. 13-18, pairs of components providing for sharing in a different manner of the functions provided thereby could be provided in the alternative.

Further convenient features of the present embodiment incorporate nutholder sections 100 each comprising upper and lower facing U-shaped rails (FIGS. 4 and 5) 101, each pair being spaced by the diameter of a flange of a reaction nut 24 (FIG. 3). Each pair of rails 101 is tilted, and stop means 102 for retaining reaction nuts 24 inserted therein.

A position maintaining assembly 110 is provided since, in power plants, the pressure vessel 1 is commonly located over a grating. Further supported by a horizontal bar 112, to the platform means 44 (FIG. 6) is a retaining means 115 incorporating a J-bolt tube 116 which may be projected by a J-bolt handle 118 and J-bolt knob 119 and project a J-bolt tab 120 to project through, rotate and then raise and grab the grating, indicated as a datum line in FIG. 5.

Figure 7:
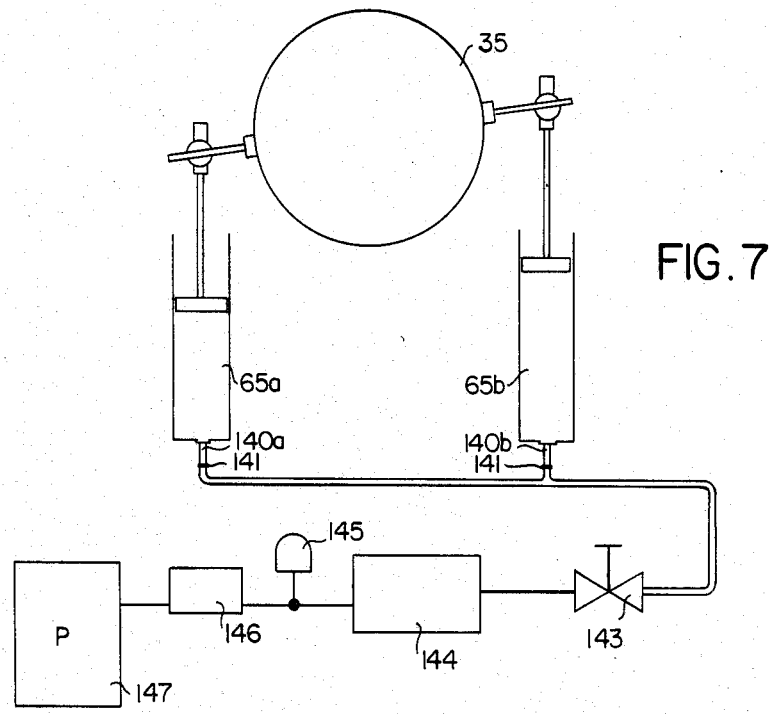
FIG. 7 is a schematic diagram of the pneumatic circuit of the apparatus illustrated in FIGS. 4 and 5.

For simplicity in illustration, fluid, preferably pneumatic, lines are not illustrated in FIGS. 4-6 but are indicated in FIG. 7 which is a schematic diagram of the pneumatic means incorporated in the present system. As seen in FIG. 7, the pneumatic cylinder 65a and 65b each have pressurized chambers connected by hoses 140 to bulkhead fittings 141, and in the pneumatic circuit, the two lines 140a and 140b join and are connected to directional valve 143 and a relieving regulator 144. A pressure set point valve 145 provides for an operation in accordance with a preselected pressure setting supplied from a pressure source 147. On-off control is provided by a valve 146.

Figure 8:
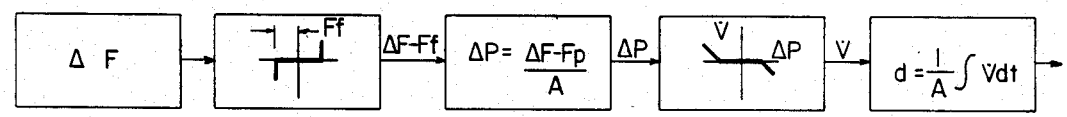
FIG. 8 is a control system block diagram illustrating the hydraulic operation of the subject system.

The apparatus functions pneumatically as described with respect to FIG. 8 which is a control system diagram. In FIG. 8, $\Delta F$ represents a force acting through a piston rod incorporated in the pneumatic cylinder 65a and 65b provided by the operator 12 in the course of positioning a manway cover 3 or tensioner ring 20. No motion occurs in response to this force, $\Delta F$ acting through the piston rod in the cylinder 65 to produce a motion of the piston rod until $\Delta F$ exceeds the static sealing load deadband or threshold value $F_f$. When the deadband value is exceeded, the absolute value of $\Delta F$ minus $F_f$ increases, the sign of the actual value depending on whether the operator is pushing up or down, so that the pressure therein is varied by $\Delta P$. $\Delta P$ equals $(\Delta F - F_f)/A$, where $\Delta P$ is the change in the pessure and $A$ is the cross-sectional area thereof. Any such $\Delta P$ is sensed by the relieving regulator 144 (FIG. 7). The regulator is inherently constructed with its own deadband. When and if $\Delta P$ exceeds the deadband $\Delta P$ of the regulator, the regulator will provide a flow into or out of the cylinder 65 so that the piston rod extends or retracts in the direction of $\Delta F$ and continues to do so until $\Delta F$ is removed. Such a system is dependent upon the hysteresis characteristics of the seals incorporated in the cylinder 65 and of the venting relief valve 143 and relieving regulator 144.

The components are built to include inherent damping. Without the inherent damping, system instability would be likely. The system acts as a force multiplying system permitting a large load, namely the manway cover 3 and the tensioner ring 20, to be moved through a space trajectory by a relatively small steering force, namely $\Delta F$. In order to achieve this end, it is highly desirable that the cylinder 65 and venting relief valve 143 are selected so that their hysteresis deadbands match. An example of a suitable pressure regulator assembly incorporating a suitable pressure regulator relief valve and venting valves is the Bellowfram type 10-BHR-102. the cylinder 65 may be embodied by the well-known C&C 77142 2½ inches by 14 inches. The pressure source 147 should be capable of providing an output so that set points controlled by the set point regulator 145 can be selected in the manway handling mode to match the weight of the manway cover 3 to and in the tensioner ring handling mode match the weight of the tensioner ring 20. By this provision of pressure into the pneumatic circuit, as explained above, the operator 12 need only apply the force $\Delta F$ to overcome damping forces within the system. The closure member 35 being operated upon, be it the manway cover 3 or tensioner ring 20 is thus made to appear to the operator to be substantially weightless.

The system and its operation are described further with respect to FIGS. 9 through 12 which are axonometric illustrations. This system further includes a primary storage cart 160 (FIGS. 9, 11 and 12) and a secondary storage cart 170 (FIG. 12). The centerlines in these illustations illustrate the manner in which the components may be brought into registration. The primary storage cart 160 includes a U-shaped support means 162 for receiving and supporting tensioner ring 20. A support means 162 is supported to support members 163 on a platform means 164 having mounted thereto translation and rotation means 165. More specifically, the translation and rotation means 165 are swivel wheels.

Similarly, the secondary storage cart 170 also comprises a substantially U-shaped support member 172 on support arms 173 carried by platform means 174. Again translation and rotation means in the forms of swivel wheels 175 are provided. The swivel wheels 165 and 175 are selected to be capable of rolling over gratings expected to be encountered in the pressure vessel environment and are of the type to allow sharp turns within tight quarters.

Beginning with FIG. 9, tensioner ring 20 is provided supported to the primary storage cart 160. The bushings 85 (previously described with respect to FIG. 4) are threaded into the tensioning ring 20 and more particularly into the bores 88 formed therein. It will be remembered that further components described have also been initially described with respect to FIGS. 4 through 6. The tensioning system handling cart 40 is positioned in front of the manway cover 3 affixed to the manway 2 at the pressure vessel 1. The working position is such that the horizontal support members 44 and 55 are toward manway cover 3 and the substantially open end faces the operator 12. The J-bolt assembly 115 (FIG. 5) is operated to fix the handling cart 40 in place. The carriage assemblies 160 and 170 are positioned in the longitudinal direction away from the pressure vessel 1. The primary storage cart 160 is rolled in to the open end of the square defined by the horizontal support members 45. Bushings 85 are rolled to vertical and horizontal registration with the shafts 75 of the T-pin 82. Both shafts 75 are moved transversely, i.e. inwardly radially with respect to the tensioner ring 20 so that the detent means thereon 77 are received in the bushings 85. Tensioning ring 20 is now gimbaled with respect to the cart 40.

The cylinders 65 are connected to the pneumatic circuit 50, as illustrated in FIG. 7, and the pressure selector valve 145 is set to provide a pressure in the cylinders from the source 147 to correspond to the weight of the tensioner ring 20. As illustrated in FIG. 4, the circuit 50 may be set with indications at preselected points corresponding to desired air pressures for the manway or the tensioner ring. The on-off switch 146 is operated to connect the source 147. Once the cylinders 65 are pressurized, the balance described with respect to FIG. 8 is provided, and the tensioner ring 20 is effectively weightless to the operator 12.

The operator 12 grasps the handles 80 of the T-pins 82 to align and guide the tensioner ring 20 along the manway studs 6 until the tensioner ring contacts the face of the manway cover 2. Since the manway cover has been in effect rendered weightless to the operator 12 and the operator is overcoming damping forces, minimal power is used to move the tensioner ring 20. Consequently, likelihood of damage to the studs 6 due to excessive force from the tensioner ring 20 is minimized.

This operation commonly involves moving the carriage assemblies 65 longitudinally along the rails 54. At this point, the tensioner ring 20 is positioned as illustrated in FIG. 10. It should be noted that the carriage assemblies 65a and 65b are transversely movable with respect to each other. The cylinders 65a and 65b are also vertically movable with respect to each other. These relative moments are accommodated by the linear/spherical bearings 69 receiving the shafts 75 of the T-pins 82. Consequently, as illustrated in FIG. 10, movements of roll, pitch and yaw are provided in addition to translational motion.

At this point, the operation illustrated in FIG. 2 may begin.

The operator 12 using the pneumatic wrench 13 and socket 14 threads a reaction nut 22 over end of each stud 6. Preferably a gap of 0.030 inches to 0.060 inches between the manway cover 2 and the tensioner ring 20 is provided, for example by spring loaded detent means (not shown) incorporated in the tensioner ring 20. At this point, the detensioning operation described with respect to FIG. 2 may be performed. After this operation is completed, the operator 12 removes the reaction nuts 22.

As illustrated in FIG. 11, the tensioner ring 20 is guided off of the manway studs 6, moved longitudinally away from the pressure vessel and lowered to the storage cart 160. For the sake of illustration, the cart 160 is shown displaced from the cart 40. However, the cart 160 will be supporting the tensioner ring 12. At this point, the pneumatic circuit 50 is operated to depressurize the pneumatic cylinders 65 by switching the air supply valve 146 to the off position. The T-pins 82 are removed from engagement with the bushings and the storage cart 160 is moved along the plant grating to a convenient, safe location.

At this point, the carriage means 65 are again moved toward the pressure vessel 1 and the T-pin 82 moved by the operator to engage the manway cover 3. Bushing 85 are also received in the manway cover 3. The T-pins 82 are inserted therein so that the manway cover 3 is gimbaled thereto. The pneumatic selector 145 is set to the manway cover pressure level and the valve 146 is turned to the on position. The cylinders 65 are now pressurized to balance the manway cover 3. The manway cover 3 is now effectively weightless. In this position, the T-pins 82 are positioned in a manner somewhat similar to the position of FIG. 10 but are in engagement with the manway cover 3 rather than the tensioner ring 20. The operator 12 may now remove the closure nuts 8 completely from each of the studs 6. The manway cover 3 may now be lowered and brought to the position illustrated in FIG. 12 to rest on the cart 170 which is positioned to receive the manway cover 3 as indicated by the dotted line in FIG. 12. The pneumatic cylinders 65 are depressurized by switching the air supply valve 146 to the off position. The T-pins 82 are removed from the manway bushings 85. At this point, the manway cover 3 may be moved by the cart 170 to a separate, safe location. The J-bolt locking means 115 is disengaged from the grating, and the cart 40 may be removed. A complete and reliable system is provided which need not be fixed with respect to the pressure vessel 1. Therefore, precise alignment prior to operation of the system need not be performed. Since the system is not installed to the power generation facility structure, no seismic qualification of the structure is required for incorporation of the manway tensioner system.

Significant features of the system include means for handling a tensioner ring and a closure member, means for moving the manway cover in a balanced state and means for positioning closure members and closure tools without the need for alignment as in a permanently-installed system and which is capable in operating in the spatial constraints of the pressure vessel embodiment. Many different embodiments may be made in accordance with the above teaching having greater or lesser amounts of physical resemblance to the above-described embodiment.

Figure 13:
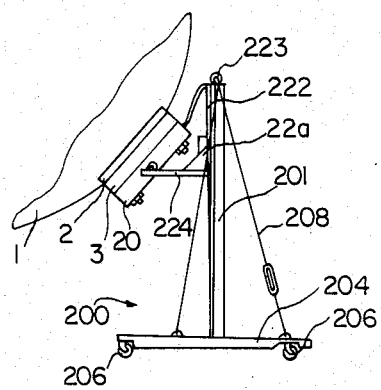
FIG. 13 is a side elevation of a further embodiment of the present invention partially illustrating a pressure vessel.
Figure 14:
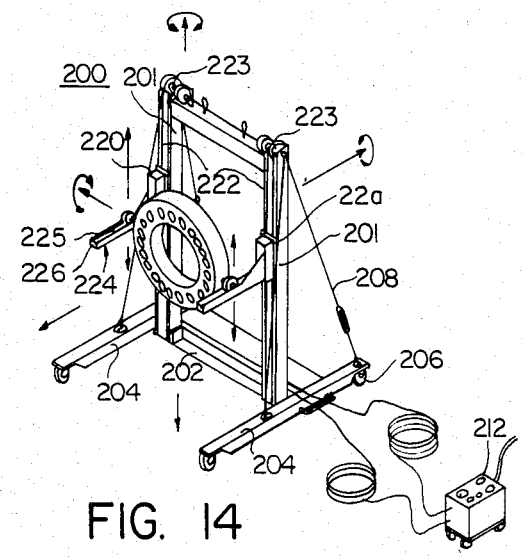
FIG. 14 is an axonometric view of the apparatus of FIG. 13.

A further embodiment is illustrated in a side elevation in FIG. 13 and in axonometric form in FIG. 14. A handling cart 200 is provided comprising upright support means 201 which may be pivotally supported to a lower horizontal support bar 202 to provide for collapsability of the system. The support bar 202 extends in a transverse direction and mounted to longitudinally extending horizontal support pieces 204 resting on translation and rotation means, namely swivel wheels 206. Guide wire means 208 maintain the support members 202 in the vertical position. In this embodiment, the hydraulic circuit 50 is embodied in a hydraulics cart 212 which may be supported on wheels to move with the cart 200. A vertically movable arm support assembly 220 is mounted in a track-like manner for vertical movement on each vertical support arm 201. The member support means 20 are connected to wires 222 rotating over pulleys 223 and each is associated with a pneumatic cylinder 65 housed within the vertical support arm 201. A horizontal, longitudinal support arm 224 is cantilevered cantilevered to each support means 220 and includes a U-shaped channel 225 terminating in stop means 226 remote from the support means 220. The wires 222 are connected to the cylinders 65 so that upward movement of an arm 224 results in a changing pressure in the cylinder 65 in a first direction and downward movement of an arm 224 results in change in pressure in the cylinder 65 in the opposite direction.

The arms 224 may be movable simultaneously vertically or with respect to each other to provide for a first rotational direction of motion as well as up or down vertical movement. A tensioning ring 20 or mayway cover 3 may be rolled by means further described with respect to FIG. 15 along the channels 225. The rolling means may be moved together or with respect to each other providing for longitudinal translational motion and for rotational motion about a vertical axis. The bearing means in this embodiment, unlike the previous embodiment, are not integral with the arms 224.

Figure 15:
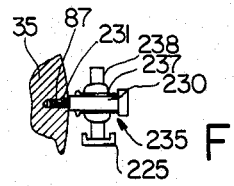
FIG. 15 is a detailed cross-sectional view of an apparatus for facilitating cooperation of tensioning rings and manway covers in the present apparatus comparable to the additional components illustrated in FIG. 4.

FIG. 15 is a partial cross-sectional illustration of a closure member 35, either a manway cover 3 or tensioner ring 20 receiving alternative means in a bore 87. In this case, a support bolt 230 having a threaded end 231 received in the bore 87 is journaled in a spherical/linear bearing 235. Bolt 230 is journaled in the spherical portion 237 which is movable within a wheel portion 238 retained by the track 225. This construction accommodates the rotation about a horizontal axis when one arm 224 is raised with respect to the other.

Figure 16:
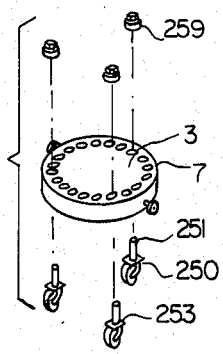
FIG. 16 illustrates a manway cover, storage, support and transport means as an alternative to those illustrated in FIG. 12.
Figure 17:
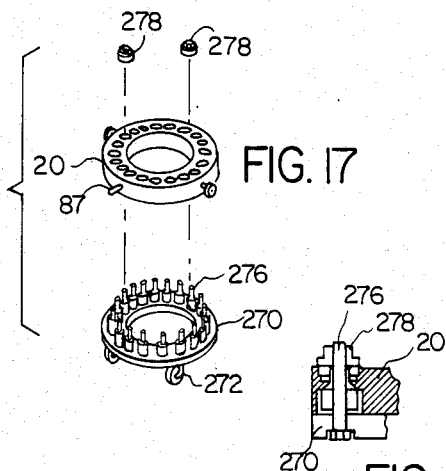
FIG. 17 illustrates tensioner ring storage, support and transport means in an embodiment alternative to that of FIG. 9 and which is further capable of acting as a test stand for a tensioner ring.

FIGS. 16 and 17 respectively illustate alternative means for handling a manway cover and a tensioner ring. FIG. 16 is vertically exploded to illustrate wheel and stop means 250 which collectively comprise transport and storage means for a manway cover 3. Wheel 250 supports a portion 251 received in one aperture 7 in a manway cover 3. Platform means 253 at a lower end of the bolt portion 251 comprise stop and support means against which the manway cover 3 rests. Threaded ends of the bolts 251 project thereabove, and closure nuts 259 are each bolted to a bolt 251 to retain the manway cover 3 thereto. Any number of assemblies 250 may be provided, but a minimum of three will provide stable horizontal support.

Figure 18:
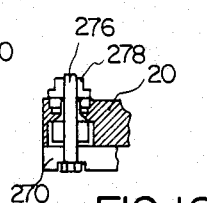
FIG. 18 is a partial detailed cross-sectional view of FIG. 17.

FIG. 17 is a vertically exploded illustration illustrating a tensioner ring pressure handling and storage cart. An annular horizontal platform 270 is supported on pivotal wheels 272. A plurality of studs 276, each similar to a stud 6 retained in the pressure vessel 1 are affixed to the platform 270 equal in number to the number of studs 6 on the pressure vessel 1. To support the tensioner ring 20, the tensioner ring 20 is placed over the studs 276 and onto the platform 270. Reaction nuts 278 are each bolted onto a stud 276 to retain the tensioner ring thereto. In this position, the tensioner ring can be wheeled into and out of engagement with the support arms 225 and also act as a test stand. As seen in FIG. 18, which is a partial cross-sectional view, these studs 276 are engaged with the tensioner ring 20 in a similar manner as illustrated in FIG. 2. The tensioner ring 20 may be tested by application of input hydraulic pressure to the hydraulic input part 87. In this manner, further system reliability is provided for.

Operation is similar to the sequence illustrated in FIGS. 9 through 12. In use, the support arms 224 are lowered to lowermost position and a tensioner ring 20 or manway cover 3 is wheeled such that each bearing wheel 235 is in vertical registration with track 225. Arms 224 are then lifted such that the manway cover 2 or tensioner ring 20 is supported to the cart 200, and operation proceeds in the manner similar to that described with respect to FIGS. 9 through 12. In the present embodiment, however, the bearing means 230 remains fixed affixed to the manway cover 2 or tensioner 20. Of course, if desired, a similar arrangement to the T-pin arrangement in FIGS. 9 through 12 could be provided.

Indeed many other modifications will be suggested by the above description to provide a system for handling in accordance with the above teachings.

What is claimed is new and desired to be secured by Letters Patent of the United States is:

1. A system for handling closure members comprising gimbaling means for receiving a selected closure member, pressurized support means supporting said gimbaling means, means for supplying to said pressurized support means pressure from a source to balance the weight of the closure member at a vertical position and being adapted to receive manual input energy from an operator for changing the position of the closure member, said pressurized support means being movably supported to movable platform means movable to a selected position, said gimbaling means being further supported to means for providing horizontal translation of the closure member with respect to said platform means to position the closure member between first and second positions in and out of registration with a vessel to be closed respectively, said gimbaling means including detachable engaging means being formed for engaging selectively a closure member in each of said first or second positions.

2. A system according to claim 1 wherein said pressurized support means comprises first and second pneumatic cylinders, each cylinder support closure member engaging rings for reciprocal vertical motion said engaging means being displaced in a horizontal degree of freedom, a distance selected with respect to a preselected manway cover size such that said engaging means may be selectively operable to engage and disengage a closure member.

3. A system according to claim 2 wherein each said cylinder is supported to a horizonally movable carriage and first and second rails each support a horizontally movable carriage supported for translational movement in a longitudinal direction and further wherein said carriages are independently movable.

4. The apparatus according claim 3 wherein said rails are supported to said vertical support means supported to platform means and wherein said platform means are supported to support means permitting translational and rotational movement of said platform.

5. Apparatus according to claim 4 wherein said closure member engaging means comprise shaft members having detent means, said shaft members each being journalled in a spherical/linear bearing.

6. Apparatus according to claim 5 further comprising channel means supported to vertical support means for receiving and supporting tensioner rings reaction nuts.

7. A system according to any of claims 1 through 6 further comprising bushing means having a first end for receiving closure member engaging means and a second end for insertion to a closure member.

8. A system according to claim 7 further comprising a manway cover having said bushing means inserted therein.

9. A system according to claim 7 further comprising a tensioner ring having said bushing means inserted therein.

10. Apparatus according to claim 2 wherein said gimbaling means are movably supported to first and second support arms, each arm mechanically coupled to a fluid cylinder and supported to a vertically disposed track, said first and second vertically disposed tracks being horizontally displaced a distance sufficient for receiving a closure member.

11. A system according to claim 10 wherein said first and second arms comprise channel means providing tracks for guiding movement of said closure member in a longitudinal direction.

12. The apparatus according to claim 11 further comprising first and second spherical/linear bearing means received in said track, said spherical/linear bearing means further comprising said engaging means.

13. The apparatus according to claim 12 further comprising a manway cover and said first and second spherical/linear bearing means affixed thereto for support in said first and second tracks.

14. The system according to claim 12 further comprising a tensioner ring having said closure member comprising a first and second spherical/linear bushings supported therein for cooperation with said support arms.

15. The system according to any of claims 1 through 6 or 10 through 14 further comprising manway cover storage and portability means comprising support means for supporting a manway cover in a position for engagement with said gimbaling means and further being movable to remove said manway from registration with said support means.

16. Apparatus according to claim 15 wherein said manway cover support storage means comprises a plurality of wheel and platform means having bolt means projecting upwardly therethrough for projecting through a manway and that means for securing said bolt means to said manway.

17. Apparatus according to claim 15 wherein said storage and portability means comprises a cart including vertical support arm means supported on a wheeled platform and supporting a means for receiving a manway cover.

18. Apparatus according to any of claims 1 through 6 or 10 through 14 further comprising tensioner ring storage and portability means for supporting a tensioner ring and a first position and registration with said gimbaling means and a second position away from said support means.

19. Apparatus according to claim 18 wherein said storage and portabilty means includes a substantially U-shaped channel for supporting a tensioner ring supported to vertical arms on a wheeled platform 20. Apparatus according to claim 18 wherein said tensioner ring storage and portability means comprises a platform, tensioner studs projecting therefrom for receiving a tensioner ring and reaction nuts for securing said tensioner ring to said platform whereby said tensioner ring is supported for test operation on said support means.

21. A system according to claim 1 wherein said gimbaling means comprises bushing means having a first end receivable in a closure member and a second end releasably engageable with said pressurized support means.

22. A system according to claim 1 further comprising a closure member having first and second bushing members supported in substantially diametrically opposed relationship, each said bushing member including a first end received in said closure member and a second end comprising means for releasably engaging said pressurized support means.

23. A system according to claim 22 wherein each said bushing member comprises a bore for receiving an axially slideable bolt.

24. A system according to claim 23 wherein each said bushing member comprises a spherical/linear bearing.

* * * * *